(12) United States Patent
Kobayashi et al.

(10) Patent No.: US 12,538,034 B2
(45) Date of Patent: Jan. 27, 2026

(54) SCENE CONTROL APPARATUS, SCENE CONTROL METHOD, IMAGE CAPTURE APPARATUS, AND VIRTUAL STUDIO SYSTEM

(71) Applicant: CANON KABUSHIKI KAISHA, Tokyo (JP)

(72) Inventors: Satoru Kobayashi, Tokyo (JP); Gou Yamashita, Kanagawa (JP); Toshimasa Suzuki, Kanagawa (JP); Ayako Furesawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 67 days.

(21) Appl. No.: 18/582,031

(22) Filed: Feb. 20, 2024

(65) Prior Publication Data
US 2024/0298090 A1 Sep. 5, 2024

(30) Foreign Application Priority Data
Mar. 2, 2023 (JP) .................................. 2023-032178

(51) Int. Cl.
*H04N 23/74* (2023.01)
*G06V 10/141* (2022.01)
*G06V 10/60* (2022.01)
*H04N 23/73* (2023.01)

(52) U.S. Cl.
CPC ........... *H04N 23/74* (2023.01); *G06V 10/141* (2022.01); *G06V 10/60* (2022.01); *H04N 23/73* (2023.01)

(58) Field of Classification Search
None
See application file for complete search history.

(56) References Cited

U.S. PATENT DOCUMENTS 10,120,267 B2 * 11/2018 Bonnier ................. G03B 15/07
10,251,462 B2 * 4/2019 Franke ................. A45D 44/005
(Continued)

FOREIGN PATENT DOCUMENTS

| CN | 108521859 B * 9/2020 | ............... H04N 9/68 |
| JP | 4003657 B2 * 11/2007 | ............. H04N 23/71 |

(Continued)

OTHER PUBLICATIONS

English translation of JP-4003657-B2 2007 (Year: 2007).*
(Continued)

*Primary Examiner* — James M Hannett
(74) *Attorney, Agent, or Firm* — Cowan, Liebowitz & Latman, P.C.

(57) ABSTRACT

A scene control apparatus capable of suppressing changes in exposure settings of a camera that captures video with an image as the background is disclosed. The apparatus acquires information relating to luminance of a captured scene of an image capture apparatus and determines, based on the information, whether a brightness of at least one of lighting equipment configured to light up the captured scene and video that is displayed as a background of the captured scene needs to be changed. According to a result of the determination, the apparatus changes the brightness of at least one of the lighting equipment that lights up the captured scene and the video that is displayed as the background of the captured scene.

16 Claims, 6 Drawing Sheets

(56) References Cited

U.S. PATENT DOCUMENTS 10,527,909 B2 \* 1/2020 Peterson ................ G03B 15/02
2022/0030139 A1 \* 1/2022 Koppetz ................ G06F 3/147

FOREIGN PATENT DOCUMENTS

JP           7190594 B1    12/2022
TW       200913682 A  \*  3/2009  ........... H04N 23/741

OTHER PUBLICATIONS

English translation of TW-200913682-A, 2009 (Year: 2009).\*
English translation of CN-108521859-B, 2020 (Year: 2020).\*
A European Search Report issued on Jul. 26, 2024, which is enclosed, that issued in the corresponding European Patent Application No. 24157245.2.

\* cited by examiner

SCENE CONTROL APPARATUS, SCENE CONTROL METHOD, IMAGE CAPTURE APPARATUS, AND VIRTUAL STUDIO SYSTEM

BACKGROUND OF THE INVENTION

Field of the Invention

The present invention relates to a scene control apparatus, a scene control method, an image capture apparatus, and a virtual studio system.

Description of the Related Art

A method (in-camera VFX) for acquiring visual effects (VFX) video without compositing background images and captured images, by capturing a subject with an image that depends on the position and orientation of the camera as the background is known (Japanese Patent No. 7190594).

During shooting of in-camera VFX video (moving image), the exposure settings of the camera can change in response to changes in the brightness of the captured scene, as a result of the automatic exposure (AE) function. In order to avoid changes in parameters such as depth of field during moving image shooting, the exposure amount is often controlled with sensitivity for capturing.

Changes in the sensitivity for capturing exert an influence on the amount of noise that is included in video. Also, when AE control is performed such that a specific subject will be correctly exposed, issues such as the background being overexposed or underexposed when the brightness of the specific subject changes can occur.

SUMMARY OF THE INVENTION

In consideration of such problems, the present invention, in one mode, provides a scene control apparatus and a scene control method capable of controlling the brightness of a captured scene so as to suppress changes in the exposure settings of a camera that captures video with an image as the background.

According to an aspect of the present invention, there is provided a scene control apparatus comprising: one or more processors that execute a program stored in a memory and thereby function as: an acquisition unit configured to acquire information relating to luminance of a captured scene of an image capture apparatus; a determination unit configured to determine, based on the information, whether a brightness of at least one of lighting equipment configured to light up the captured scene and video that is displayed as a background of the captured scene needs to be changed; and a control unit configured to change, according to a result of the determination, the brightness of at least one of the lighting equipment that lights up the captured scene and the video that is displayed as the background of the captured scene.

According to another aspect of the present invention, there is provided an image capture apparatus comprising: one or more processors that execute a program stored in a memory and thereby function as: a generation unit configured to generate information relating to a luminance of a captured scene; an output unit configured to output the information to an external apparatus; a determination unit configured to determine exposure settings that are based on the information; and an image capture unit configured to capture based the exposure settings, wherein the determination unit, in a case where the exposure settings that are based on the information change to exceed a predetermined range from current exposure settings, determines exposure settings that does not exceed the predetermined range from the current exposure settings.

According to a further aspect of the present invention, there is provided a virtual studio system comprising: an image capture apparatus according to the present invention; a scene control apparatus according to the present invention; a display apparatus configured to display a background of a captured scene of the image capture apparatus; and lighting equipment configured to light up a subject present in the captured scene.

According to another aspect of the present invention, there is provided a scene control method for execution by a scene control apparatus, the method comprising: acquiring information relating to luminance of a captured scene of an image capture apparatus; determining, based on the information, whether a brightness of at least one of lighting equipment configured to light up the captured scene and video that is displayed as a background of the captured scene needs to be changed; and changing, according to a result of the determination, the brightness of at least one of the lighting equipment that lights up the captured scene and the video that is displayed as the background of the captured scene.

According to a further aspect of the present invention, there is provided a non-transitory computer-readable medium storing a program that causes, when executed by a computer, the computer to function as a scene control apparatus comprising: an acquisition unit configured to acquire information relating to luminance of a captured scene of an image capture apparatus; a determination unit configured to determine, based on the information, whether a brightness of at least one of lighting equipment configured to light up the captured scene and video that is displayed as a background of the captured scene needs to be changed; and a control unit configured to change, according to a result of the determination, the brightness of at least one of the lighting equipment that lights up the captured scene and the video that is displayed as the background of the captured scene.

Further features of the present invention will become apparent from the following description of exemplary embodiments (with reference to the attached drawings).

DESCRIPTION OF THE EMBODIMENTS

Figure 1:
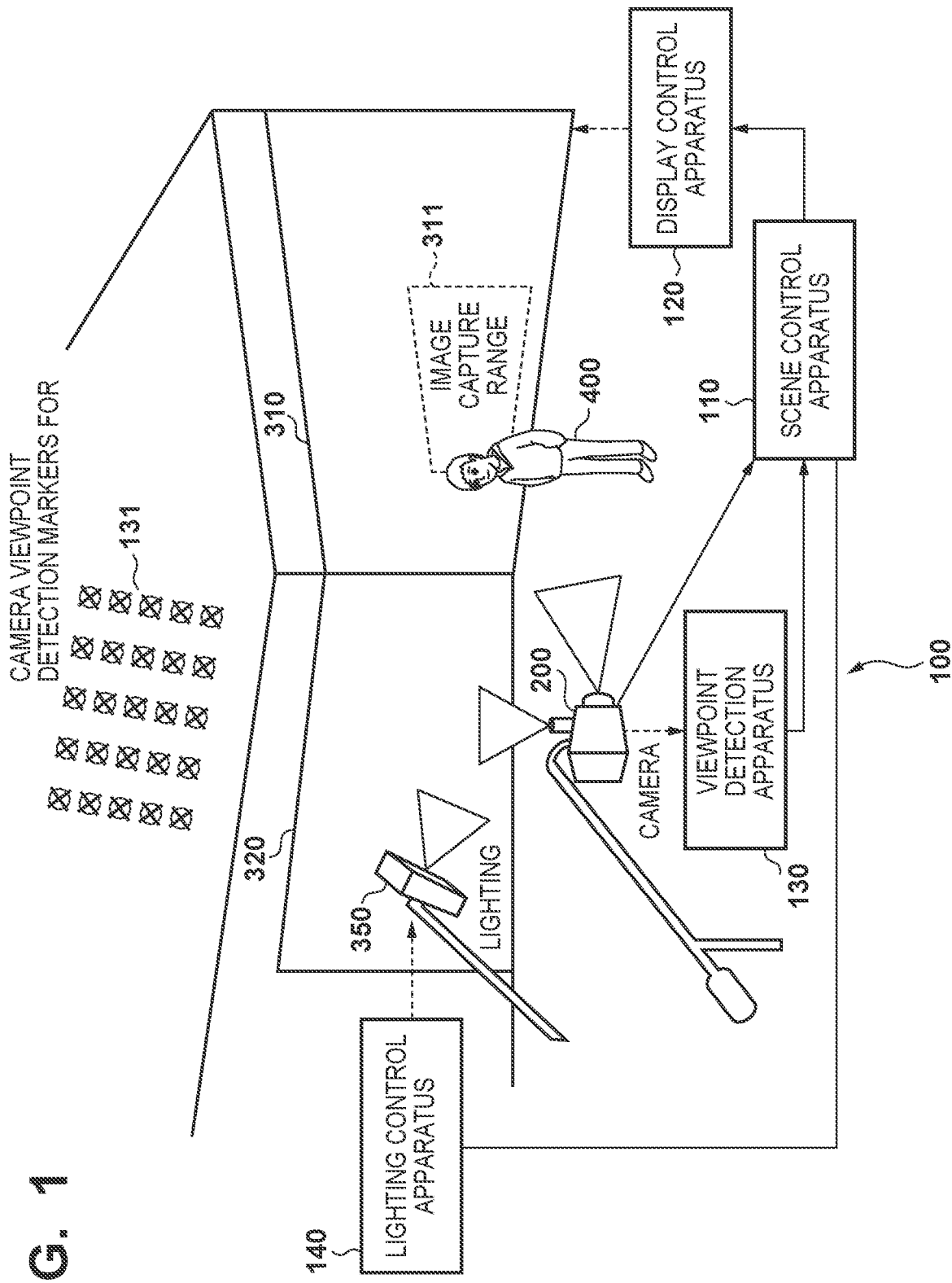
FIG. 1 is a schematic diagram of a virtual studio system according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Overview of Virtual Studio System

FIG. 1 is a schematic diagram of a virtual studio system according to an embodiment. In a virtual studio 100, a camera 200 captures in-camera VFX video by capturing images of a real subject 400, with an image that is displayed on large-screen display apparatuses 310 and 320, also called an LED wall, as the background, for example. An image capture range 311 is an example of the range of the background image that is captured by the camera 200.

A viewpoint detection apparatus 130 detects a viewpoint (position and orientation) of the camera 200, based on absolute coordinates of markers 131 provided on a ceiling and the positions of the markers 131 in an image of the ceiling that is captured by a viewpoint detection camera provided in the camera 200. Note that the position and orientation of the camera 200 can be detected using any known method.

A scene control apparatus 110 performs rendering of a preset three-dimensional model of virtual space according to a viewpoint of the camera 200 detected by the viewpoint detection apparatus 130, and generates a computer graphics (CG) background image at a predetermined frame rate. Note that, in the case where the shooting direction of the camera 200 is not directly facing the display apparatuses 310 and 320, the scene control apparatus 110 applies coordinate transformation (transformation processing) necessary in order to display the background image on the display apparatuses 310 and 320. The scene control apparatus 110 outputs the generated background image to a display control apparatus 120. Also, the scene control apparatus 110 controls the captured scene, particularly the brightness of lighting equipment 350 that lights up the real subject 400, by controlling a lighting control apparatus 140, based on information relating to the luminance of the captured scene that is obtained from the camera 200.

The display control apparatus 120 causes the display apparatuses 310 and 320 to display the background image to coincide with the image capture timing of the camera 200. In the case where the display apparatuses 310 and 320 are each constituted by a plurality of display panels, the display control apparatus 120 causes display to be performed after dividing the background image according to the number of display panels.

Note that, in FIG. 1, information relating to the luminance of the captured scene of the camera 200 is supplied to the scene control apparatus 110 from the camera 200. However, information relating to the luminance of the captured scene may be supplied to the scene control apparatus 110 from an external exposure meter separate from the camera 200.

Also, a synchronization signal is supplied to the camera 200, the viewpoint detection apparatus 130, the scene control apparatus 110 and the display control apparatus 120 from a reference clock generation apparatus, which is also called a sync generator. As a result of each apparatus controlling the operation timing in accordance with the reference clock, synchronization of the shooting period of the camera 200 and the display period of the display apparatuses 310 and 320 and the like are realized. Since technologies for synchronizing operations between apparatuses based on a reference clock, such as generator locking (genlock), for example, are known, a detailed description thereof will be omitted.

Herein, a subject that is included in the background image displayed on the display apparatuses 310 and 320 will be referred to as a virtual subject, as opposed to the real subject 400 that is present between the display apparatuses 310 and 320 and the camera 200. Note that, for convenience, herein, it is assumed that the real subject and the virtual subject are human subjects, but there is no limitation to the type of subject or the number of types.

Figure 2:
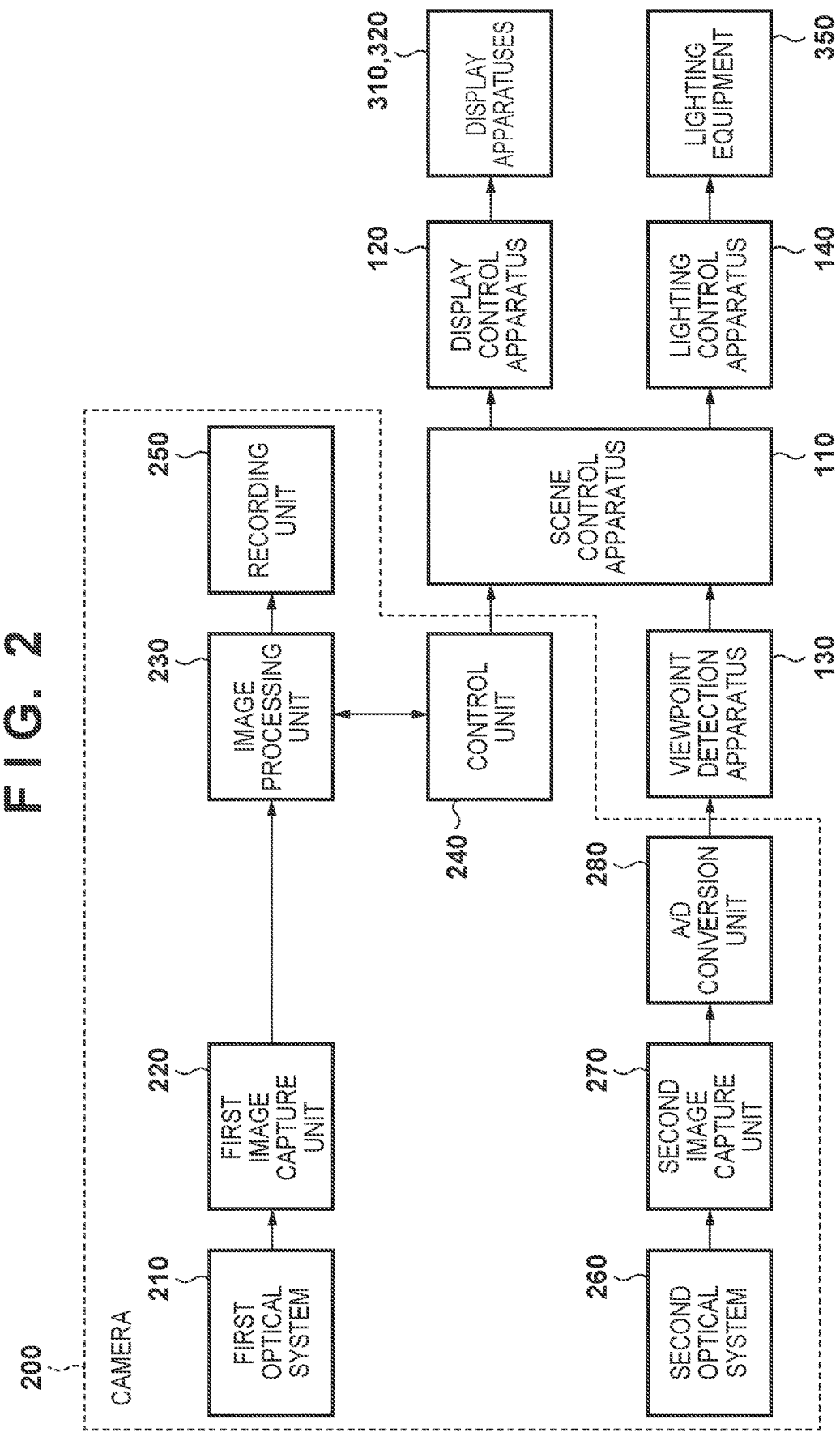
FIG. 2 is a block diagram showing an example functional configuration of a camera in FIG. 1 and the connection relation between devices.

FIG. 2 is a block diagram showing the connection relation of the apparatuses shown in FIG. 1 and an example functional configuration of the camera 200. Among the functional blocks of the camera 200, a first optical system 210, a first image capture unit 220, an image processing unit 230 and a recording unit 250 realize a function of capturing and recording in-camera VFX video. Also, a second optical system 260, a second image capture unit 270 and an A/D conversion unit 280 realize a function of capturing images for detecting the viewpoint of the camera 200. Hereinafter, unless otherwise stated, the first image capture unit 220 and the second image capture unit 270 capture a moving image having a predetermined frame rate.

A control unit 240 has a processor (CPU, MPU, microprocessor, etc.) capable of executing programs, a ROM and a RAM. The control unit 240 controls the operations of each functional block of the camera 200 and realizes the operations of the camera 200 described later, by loading programs stored in the ROM to the RAM and executing the programs. Note that, although not illustrated, the control unit 240 is communicatively connected to each functional block of the camera 200.

The angle of view and optical axis direction of the second optical system 260 are determined so as to capture an image of the markers 131 for viewpoint detection disposed on the ceiling of the studio. The angle of view may be fixed or changeable. The second image capture unit 270 has an image sensor, and converts an optical image formed by the second optical system 260 into an analog image signal. Since the image for viewpoint detection can be any image in which the image coordinates of the markers 131 can be acquired, color information is not required, and a monochrome image sensor may be used.

The A/D conversion unit 280 performs A/D conversion on the analog image signal that is output by the second image capture unit 270 to generate a digital image signal. The digital image signal is output to the viewpoint detection apparatus 130.

The first optical system 210 is an optical system for capturing in-camera VFX video. Accordingly, the angle of view and optical axis direction of the first optical system are determined so as to form an optical image of the real subject 400 with the image displayed on the display apparatuses 310 and 320 as the background. The angle of view of the first optical system 210 may be changeable.

The first image capture unit 220 has an image sensor and converts the optical image that is formed by the first optical system 210 into an analog image signal. The image sensor included in the first image capture unit 220 may be a known CCD or CMOS color image sensor having a Bayer primary color filter, for example. The analog image signal that is output by the first image capture unit 220 is supplied to the image processing unit 230.

The image processing unit 230 performs processing such as generating signals and image data that depend on the application, and acquiring and/or generating various information, by applying predetermined image processing to the analog image signal output by the first image capture unit 220. The image processing unit 230 may be a dedicated hardware circuit such as an application specific integrated circuit (ASIC) designed to realize a specific function, for example. Alternatively, the image processing unit 230 may be configured to realize a specific function as a result of a processor such as a digital signal processor (DSP) or a graphics processing unit (GPU) executing software.

The image processing that is applied by the image processing unit 230 can, for example, include preprocessing, color interpolation processing, correction processing, detection processing, data processing, evaluation value calculation processing and special effects processing.

Preprocessing can include A/D conversion, signal amplification, reference level adjustment and defective pixel correction.

The color interpolation processing is processing that is performed in the case where the image sensor is provided with a color filter, and involves interpolating the values of color components that are not included in the individual pixel data constituting the image data. Color interpolation is also called demosaicing.

Correction processing can include white balance adjustment, tone correction, correction of image degradation caused by optical aberration of the first optical system 210 (image recovery), correction of the influence of peripheral dimming of the first optical system 210 and color correction.

The detection processing can include detection of a feature region or a region of a specific subject (e.g., face region or body region), movement thereof, and person recognition.

The data processing can include processing such as cutting a region down in size (trimming), compositing, scaling, encoding/decoding and header information generation (data-file generation). The data processing can also include generation of image data for display and image data for recording.

The evaluation value calculation processing can include processing such as generation of signals and evaluation values to be used in autofocus detection (AF) and generation of evaluation values to be used in automatic exposure control (AE). An evaluation value to be used in AE is information relating to the luminance of the captured scene, and this information can relate to the luminance of different portions of the captured scene, according to the exposure mode that is set, for example. For example, this information may reflect the luminance of the entire captured scene, or may relate to the luminance of a region of a specific subject.

The special effects processing can include addition of bokeh effect, changing the color tone and relighting.

Note that the above are illustrative examples of processing applicable by the image processing unit 230, and do not limit the processing that is applied by the image processing unit 230. The image processing unit 230 outputs acquired or generated information and data to functional blocks that correspond to the application. For example, the image processing unit 230 outputs image data for recording to the recording unit 250, and outputs information relating to the luminance of the captured scene to the control unit 240.

The control unit 240 outputs the information relating to the luminance of the captured scene, acquired from the image processing unit 230, to the scene control apparatus 110. Also, the control unit 240 is able to execute AE processing for determining the exposure settings based on the information relating to the luminance of the captured scene, and to control the operations of the first image capture unit 220 in accordance with the determined exposure settings. The control unit 240 is able to determine the exposure settings such that the entire captured scene is appropriately exposed or such that a region (e.g., region of specific subject) of a portion included in the captured scene is appropriately exposed, for example.

Note that the exposure settings are generally determined by a combination of aperture value, shutter speed (exposure time) and sensitivity for capturing. Thus, the control unit 240 is able to determine a combination of the values of these three parameters as exposure settings for obtaining a correct exposure. However, when the aperture value or exposure time is changed during moving image shooting, the depth of field changes and the distance that a moving subject moves between frames changes. Thus, in the AE processing of the present embodiment, the sensitivity for capturing is, in general, determined without changing the aperture value or shutter speed.

Furthermore, in the present embodiment, the control unit 240 has an AE restriction mode in which reflection of the exposure settings determined by the AE processing in actual image capturing is restricted, in addition to a normal AE mode in which image capture is performed using the exposure settings determined by the AE processing. Specifically, the control unit 240 has a first AE restriction mode in which the exposure settings determined by the AE processing are not reflected at all, and a second AE restriction mode in which the range for reflecting the sensitivity for capturing determined by the AE processing is limited. In the second AE restriction mode, if the sensitivity for capturing determined by the AE processing is included in a predetermined range of sensitivity for capturing, the sensitivity for capturing is directly reflected, if the sensitivity for capturing exceeds the upper limit value of the range, the sensitivity for capturing is set to the upper limit value, and if the sensitivity for capturing is less than the lower limit value of the range, the sensitivity for capturing is set to the lower limit value.

Note that the focusing distance of the first optical system 210 is automatically adjustable as a result of the control unit 240 executing the AF processing based on the evaluation values generated by the image processing unit 230. On the other hand, since the distance between the camera 200 and the ceiling is substantially constant, the focusing distance of the second optical system 260 may be adjusted by manual focus before image capture, and not be adjusted during image capture. Note that a configuration may be adopted in which, by constituting the A/D conversion unit 280 similarly to the image processing unit 230, the control unit 240 also performs automatic adjustment of the focusing distance of the second optical system 260 by AF processing.

Figure 3:
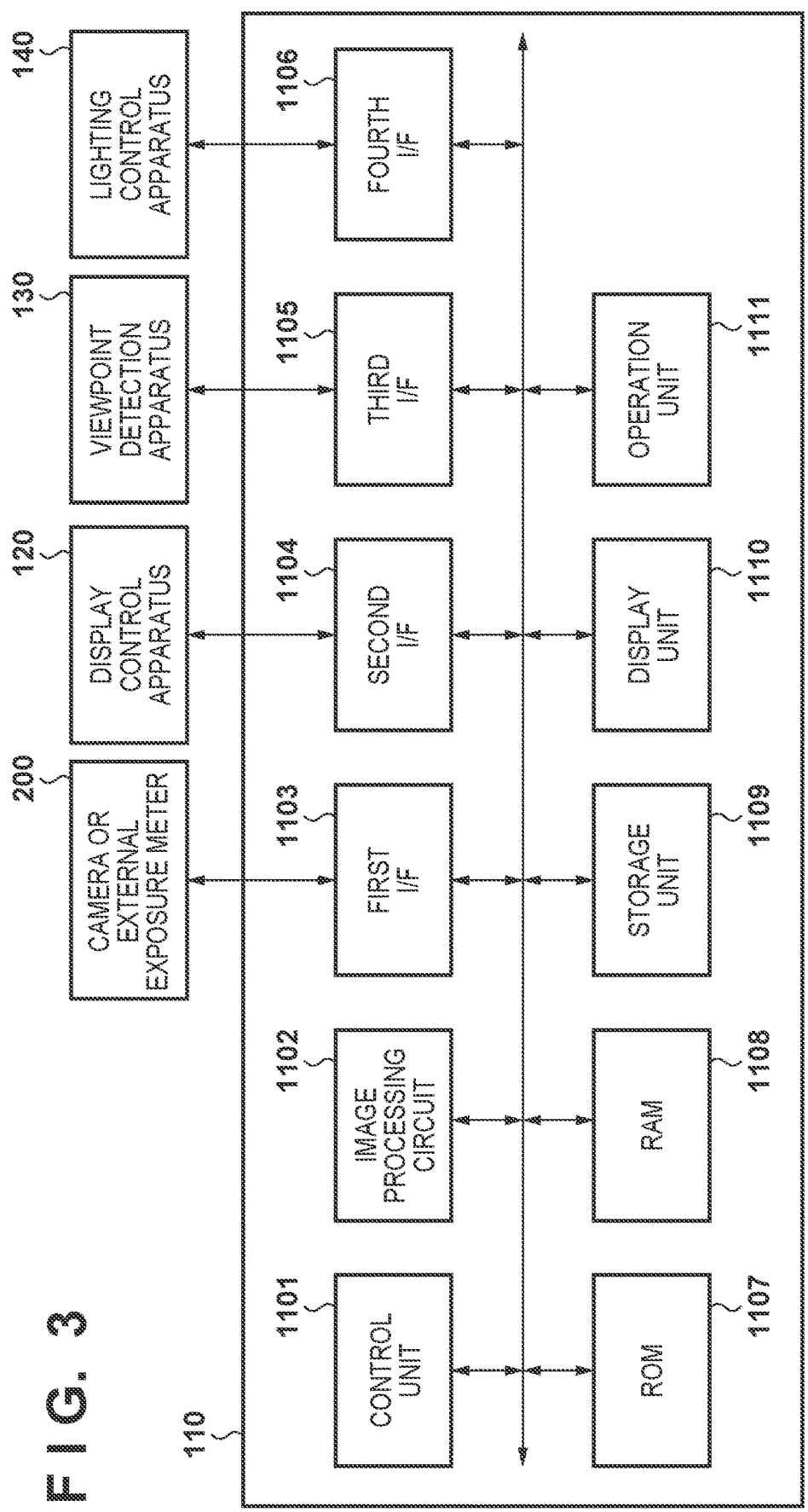
FIG. 3 is a block diagram showing an example functional configuration of a scene control apparatus in FIG. 1.

FIG. 3 is a block diagram illustrating an example functional configuration of the scene control apparatus 110. The scene control apparatus 110 can be realized using a computer device, for example.

A control unit 1101 is, for example, a CPU, and realizes the functions of the scene control apparatus 110, by loading one or more application programs stored in a ROM 1107 into a RAM 1108 and executing the one or more application programs. Note that the control unit 1101 controls the operation timing of the scene control apparatus 110 in accordance with the synchronization signal that is supplied from the reference clock generation apparatus.

An image processing circuit 1102 is, for example, a graphics board equipped with a GPU. The image processing circuit 1102 is capable of executing image processing, such as rendering of CG, at high speed.

First to fourth I/Fs 1103 to 1106 are communication interfaces for connecting external apparatuses. In the present embodiment, the camera 200 or an external light meter is connected to the first I/F 1103, the display control apparatus 120 is connected to the second I/F 1104, the viewpoint detection apparatus 130 is connected to the third I/F 1105, and the lighting control apparatus 140 is connected to the fourth I/F 1106. Note that, herein, the first to fourth I/Fs 1103 to 1106 conform to standards that depend on the type of external apparatus that is connected and the type of signal that is communicated. For convenience, the scene control apparatus 110 and the external apparatus are illustrated as being connected through one I/F, but may be connected using a plurality of I/Fs.

The control unit 1101 acquires captured image data and information relating to the luminance of the captured scene from the camera 200 through the first I/F 1103. Also, the control unit 1101 acquires information relating to the viewpoint of the camera 200 from the viewpoint detection apparatus 130 by communication through the third I/F 1105. The control unit 1101 outputs display image data (background image data) to the display control apparatus through the second I/F 1104. Also, the control unit 1101 outputs a control signal to the lighting control apparatus 140 through the fourth I/F 1106. Note that the scene control apparatus 110 may have five or more communication interfaces with external apparatuses.

The ROM 1107 stores some of the programs (BIOS, bootstrap loader, firmware) that are executed by the control unit 1101, setting values of the scene control apparatus 110, and the like.

The RAM 1108 is used as a working memory of the image processing circuit 1102 and as a video memory of a display unit 1110, in addition to being used as a main memory of the control unit 1101.

A storage unit 1109 is a mass storage device such as a hard disk or an SSD. The storage unit 1109 stores basic software (OS), application programs, user data and the like. An application program (e.g., game engine application) that generates a background image corresponding to the viewpoint of the camera 200, and data required for generating the background image (3D model of virtual space, texture, etc.) are also stored in the storage unit 1109.

The display unit 1110 is, for example, a liquid crystal display apparatus. The display unit 1110 may be a touch display. The display unit 1110 displays a scene control application, a background image generation application (e.g., game engine), a GUI provided by the OS, and the like.

The operation unit 1111 has a plurality of input devices that are operable by the user, such as a keyboard, a mouse and a touchpad. In the case where the display unit 1110 is a touch display, a touch panel is a constituent element of the operation unit 1111.

In the present embodiment, in order to suppress changes in the exposure settings of the camera 200 or to suppress overexposure or underexposure of the background image in the in-camera VFX video, the brightness of at least one of the background image and the lighting equipment is controlled according to the change in brightness of the captured scene of the camera 200.

Hereinafter, scene control operations for controlling the brightness of at least one of the background image and the lighting equipment in order to suppress changes in the exposure settings of the camera 200 are scene control operations of a first mode. Also, scene control operations for controlling the brightness of at least one of the background image and the lighting equipment in order to suppress overexposure or underexposure of the background image in in-camera VFX video captured by the camera 200 are scene control operations of a second mode.

The scene control operations of the first and second modes are not exclusive and can be executed as appropriate. For example, in the case where overexposure or underexposure of the background image can occur, the scene control operations of the second mode can be executed, and, in the case where the exposure settings of the camera 200 need to be changed, the scene control operations of the first mode can be executed. Alternatively, in the case where the brightness of the entire captured scene has changed, the scene control operations of the first mode can be executed, and, in the case where the brightness of a region of a specific subject has changed, the scene control operations of the second mode can be executed. Note that these are merely examples, and the type of scene control operations to be executed may be automatically determined in accordance with other conditions. Alternatively, the scene control operations of a mode instructed or set by the user may be executed.

Scene Control Operations of First Mode

Next, the scene control operations of the first mode will be described using the flowchart shown in FIG. 4. Note that the following operations are executed while the camera 200 is capturing in-camera VFX video (moving image). Here, the moving image may be for recording or display. A moving image for display may be for implementing live view display while the camera 200 is in an image capture standby state, for example. Also, the camera 200 is assumed to be operating in the first or second AE restriction mode.

Note that since it is possible for the following series of processing required in order to capture in-camera VFX video to be executed by a known method, a detailed description of the respective processing will be omitted.

Processing for detecting the viewpoint (position and orientation) of the camera 200 by the viewpoint detection apparatus 130 using an image of the markers 131
  Processing for generating a background image by the scene control apparatus 110 according to the detected viewpoint of the camera 200
  Processing for controlling display of the background image on the display apparatuses 310 and 320 by the display control apparatus 120

Also, the scene control apparatus 110 controls the brightness (including turning off) of the lighting equipment 350 through the lighting control apparatus 140, in accordance with a lighting pattern set in advance according to the elapsed time (timeline) from the start of image capture. The position and irradiation direction of the lighting equipment 350 may be fixed, or the position and irradiation direction may dynamically change in cases such as where an image capture staff member holds the lighting equipment 350 by hand, for example.

In the following description, the operations that are executed by the scene control apparatus 110 are actually realized by the control unit 1101 executing an appropriate application program. Also, the scene control unit 110 is assumed to acquire the exposure settings (aperture value, shutter speed, sensitivity for capturing) from the camera 200 at least at the point in time that image capture is started. The scene control unit 110 regards the exposure settings at the start of image capture in the camera 200 to be exposure settings configured such that the correct exposure is obtained in the camera 200.

In step S401, the scene control apparatus 110 acquires information relating to the viewpoint (position and orientation) of the camera 200 detected by the viewpoint detection apparatus 130.

In step S403, the scene control apparatus 110 acquires information relating to the luminance of the captured scene from the camera 200 or an external exposure meter. Here, it is assumed that the luminance of the entire captured scene (e.g., the average value of luminance) is acquired.

In step S405, the scene control apparatus 110 determines whether the brightness of the captured scene is appropriate with the exposure settings of the camera 200 in the current AE restriction mode, based on the information relating to the luminance of the captured scene acquired in step S403 and the exposure settings acquired from the camera 200.

For example, in the case where the first AE restriction mode is set, the scene control apparatus 110 determines that the brightness of the captured scene is appropriate, if it is determined that appropriately exposed VFX video can be captured without changing the exposure settings of the camera 200. Also, in the case where the second AE restriction mode is set, the scene control apparatus 110 determines that the brightness of the captured scene is appropriate, if the amount of change in the exposure settings (sensitivity for capturing) of the camera 200 for obtaining appropriately exposed VFX video is within a predetermined range. The predetermined range may be ±two steps referenced on the exposure settings acquired from the camera 200, for example.

The scene control apparatus 110 is able to determine whether appropriately exposed VFX video can be captured with the exposure settings of the camera 200, based on prestored combinations of exposure settings that result in correct exposure and scene luminance. The scene control apparatus 110 executes step S407 if it is determined that the brightness of the captured scene is appropriate, and executes step S413 if it is not determined that the brightness is appropriate.

In step S407, the scene control apparatus 110 generates a CG background image, by rendering a 3D model of virtual space using the viewpoint and angle of view of the camera 200. In the case of transitioning from step S405 to step S407, the scene control apparatus 110 generates the background image without changing the rendering parameters relating to brightness from the default values. The scene control apparatus 110 outputs data of the generated background image to the display control apparatus 120. Note that, in the case where the image capturing direction of the camera 200 is not directly facing the display apparatuses 310 and 320, the scene control apparatus 110 outputs the data of the background image to the display control apparatus 120 after applying processing for transforming the background image into an image viewed from a position directly facing the display apparatuses 310 and 320.

In step S409, the display control apparatus 120 causes the display apparatuses 310 and 320 to display the data of the background image generated by the scene control unit 110.

In step S411, the scene control unit 110 determines whether to end image capture. The scene control unit 110 is able to determine to end image capture, for example, if image capture in accordance with a predetermined timeline is completed, or if the user instructs to end image capture through the operation unit 1111. The scene control apparatus 110 ends the scene control operations if it is determined to end image capture, and executes the operations from step S401 again if it is not determined to end image capture.

If it is not determined in step S405 that the brightness of the captured scene is appropriate, the scene control apparatus 110 determines in step S413 whether the captured scene is dark (underexposed) with the exposure settings of the camera 200. The scene control apparatus 110 executes step S415 if it is determined that the captured scene is dark with the exposure settings of the camera 200, and executes step S421 if it is not determined that the captured scene is dark.

In step S415, the scene control apparatus 110 determines the amount of increase in brightness of the lighting equipment 350. If the captured scene is dark, the brightness of the lighting equipment 350 and the brightness of the background image are increased (brightened), such that appropriately exposed VFX video is obtained with the exposure settings of the camera 200 that are determined in the current AE restriction mode. Specifically, the scene control apparatus 110 determines an amount of increase in brightness corresponding to the insufficient exposure amount. For example, if the exposure amount is insufficient by n steps of sensitivity for capturing, the amount of increase in brightness can be determined as $2^n$. Note that the insufficient exposure amount can be obtained by comparing, for example, the brightness of the captured scene that is appropriately exposed with the exposure settings of the camera 200 and the brightness indicated by the information relating to the luminance of the captured scene acquired in step S403.

Note that since the light that is emitted by the lighting equipment 350 attenuates with distance, the amount of change in brightness in the region that is lighted up by the lighting equipment 350 will be smaller than the amount of increase in brightness. Accordingly, the amount of increase in brightness may be corrected, according to the distance between the lighting equipment 350 and the region that is lighted up by the lighting equipment 350. Since the correction amount can depend on the type and light emission pattern of the light source that is used by the lighting equipment 350, amounts of increase in brightness and correction amounts can be stored in association with each other in advance.

In step S417, the scene control apparatus 110 changes (brightens) the brightness of the lighting equipment 350, by outputting the amount of increase in brightness to the lighting control apparatus 140.

In step S419, the scene control apparatus 110 determines the amount of increase in brightness of the background image. The amount of increase in brightness of the background image may also be a value corresponding to the insufficient exposure amount. Accordingly, the amount of increase in brightness of the lighting equipment 350 may be used as the amount of increase in brightness of the background image.

In step S407, the scene control unit 110 generates a CG background image, by rendering a 3D model of virtual space using the viewpoint and angle of view of the camera 200. In the case of executing step S407 after step S419, the scene control apparatus 110 generates a background image in which the brightness has been changed, by applying the amount of increase in brightness to the rendering parameters. The scene control apparatus 110 outputs data of the generated background image to the display control apparatus 120. The operations in step S409 and step S411 are as described above.

In step S421, the scene control apparatus 110 determines the amount of decrease in brightness of the lighting equipment 350. If the captured scene is bright, the brightness of the lighting equipment 350 and the brightness of the background image are lowered (darkened), such that appropriately exposed VFX video is obtained with the exposure settings of the camera 200 determined in the current AE restriction mode. Specifically, the scene control apparatus 110 determines an amount of decrease in brightness corresponding to the excessive exposure amount. For example, if the exposure amount is excessive by n steps of sensitivity for capturing, the amount of decrease in brightness can be determined as $2^{-n}$. Note that the excessive exposure amount can be obtained by comparing, for example, the brightness of the captured scene that is appropriately exposed with the exposure settings of the camera 200 and the brightness indicated by the information relating to the luminance of the captured scene acquired in step S403.

Note that the amount of decrease in brightness may be corrected similarly to the case of brightening the lighting equipment 350. Since the correction amount can also depend on the type and light emission pattern of the light source that is used by the lighting equipment 350, amounts of decrease in brightness and correction amounts can be stored in association with each other in advance.

In step S423, the scene control apparatus 110 changes (darkens) the brightness of the lighting equipment 350, by outputting the amount of decrease in brightness to the lighting control apparatus 140.

In step S425, the scene control apparatus 110 determines the amount of decrease in brightness of the background image. The amount of decrease in brightness of the background image may also be a value corresponding to the excessive exposure amount. Accordingly, the amount of decrease in brightness of the lighting equipment 350 may be used as the amount of decrease in brightness of the background image.

In step S407, the scene control unit 110 generates a CG background image, by rendering a 3D model of virtual space using the viewpoint and angle of view of the camera 200. In the case of executing step S407 after step S425, the scene control apparatus 110 generates a background image in which the brightness has been changed, by applying the amount of decrease in brightness to the rendering parameters. The scene control apparatus 110 outputs data of the generated background image to the display control apparatus 120. The operations in step S409 and step S411 are as described above.

Note that, instead of applying the amount of increase or decrease in brightness to the rendering parameters to change the brightness of the background image, the brightness of the background image may be changed by controlling the display apparatuses 310 and 320. Specifically, the scene control apparatus 110, in step S407, generates the background image without changing the rendering parameters relating to brightness from the default values. The scene control apparatus 110 then outputs the data of the background image and the amount of increase or decrease in brightness to the display control apparatus 120.

In the case where the amount of increase or decrease in brightness is provided from the scene control apparatus 110, the display control apparatus 120 applies the amount of increase or decrease in brightness to a brightness serving as a reference of the display apparatuses 310 and 320 and causes the data of the background image to be displayed. The display apparatuses 310 and 320 thereby display the background image at a brightness reflecting the amount of increase or decrease in brightness.

Scene Control Operations of Second Mode

Figure 5A:
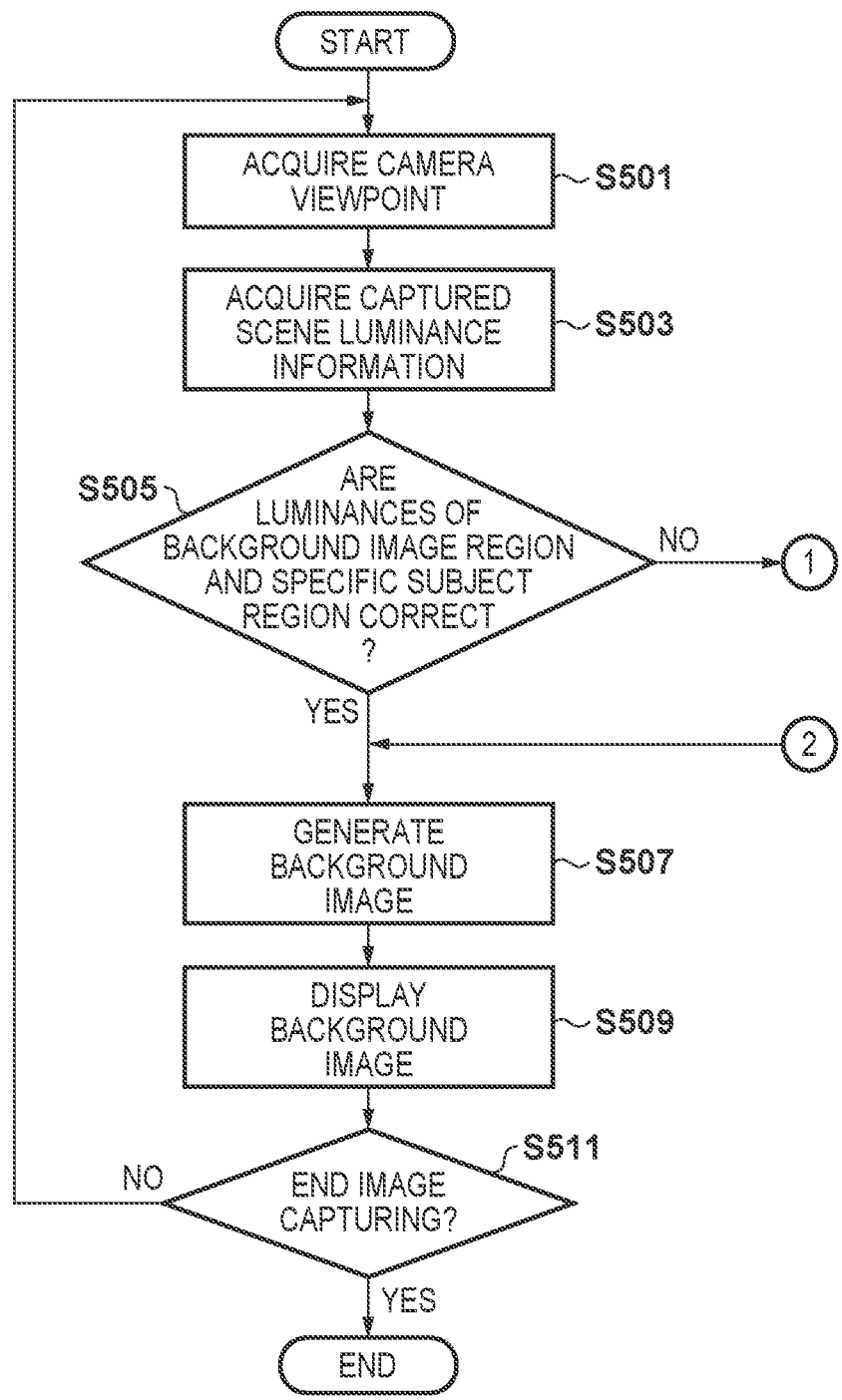
FIGS. 5A and 5B are flowcharts relating to scene control operations of a second mode.
Figure 5B:
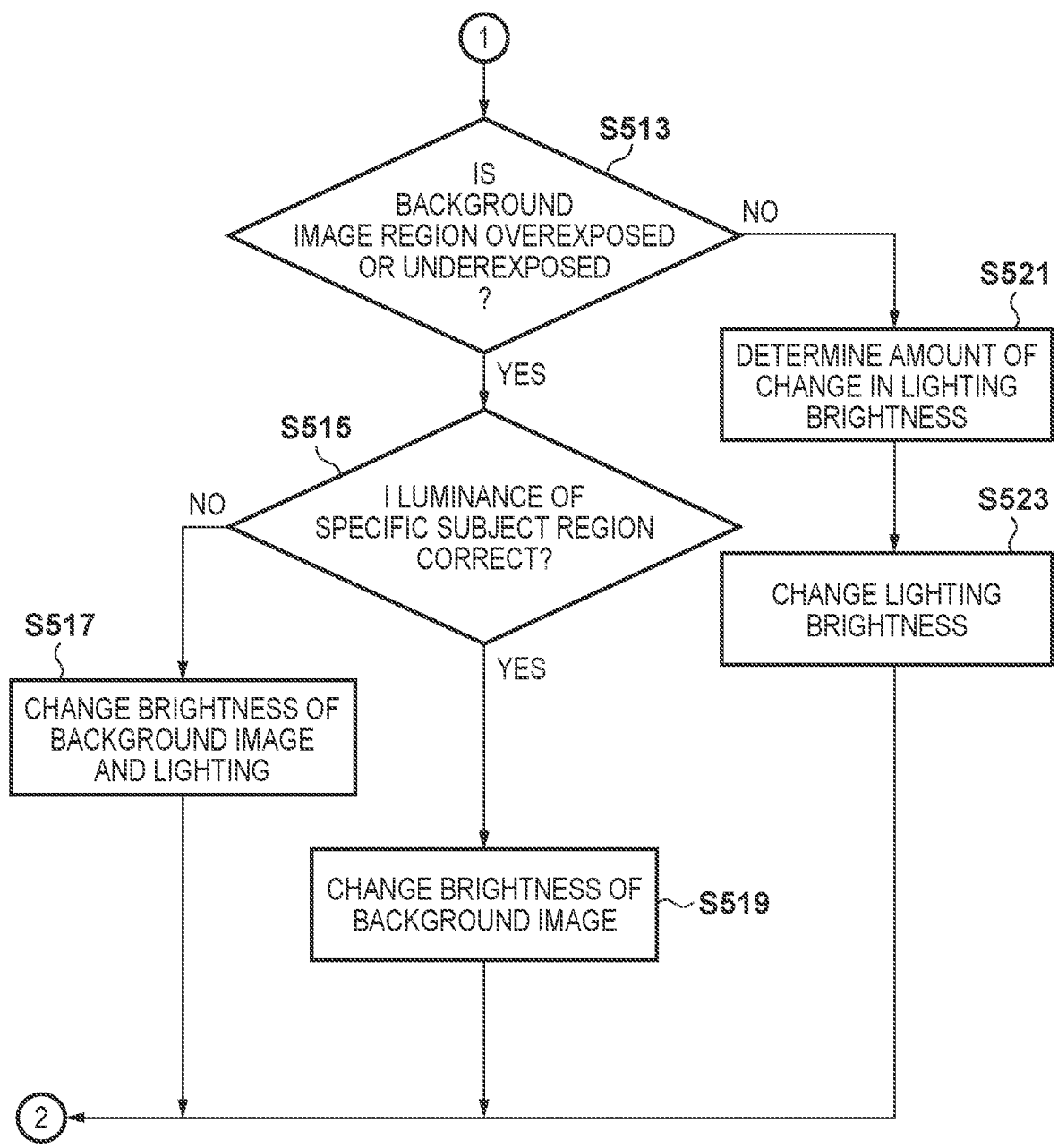

Next, the scene control operations of the second mode will be described using the flowchart shown in FIGS. 5A and 5B. Note that the scene control operations of the second mode are also executed while the camera 200 is capturing in-camera VFX video (moving image). Also, the other preconditions are similar to the scene control operations of the first mode.

In step S501, the scene control apparatus 110 acquires information relating to the viewpoint (position and orientation) of the camera 200 detected by the viewpoint detection apparatus 130.

In step S503, the scene control apparatus 110 acquires information relating to the luminance of the captured scene from the camera 200 or an external exposure meter. Here, the luminance of a region of the background image (e.g., the average value of luminance) and the luminance of a region of the specific subject in the captured scene are acquired. The region of the specific subject is the region in which the camera 200 performs exposure control such that that region is appropriately exposed. Here, this region is a region of the real subject 400 (face region or body region). In the case of using an external exposure meter, an external exposure meter for measuring the luminance of the display apparatus and an external exposure meter for measuring the luminance of the real subject 400 may be used.

In step S505, the scene control apparatus 110 determines whether the brightness of the region of the background image and the brightness of the region of the specific subject are appropriate with the exposure settings of the camera 200 in the current AE restriction mode. The scene control apparatus 110 determines whether the brightness of the region of the background image and the brightness of the region of the specific subject are appropriate, based on the information relating to the brightness of each region acquired in step S503 and the exposure settings acquired from the camera 200. The determination method may be the same as that described in step S405. The scene control apparatus 110 executes step S507 if it is determined that the brightness of the region of the background image and the brightness of the region of the specific subject are both appropriate, and executes step S513 if it is not determined that the brightnesses are appropriate.

In step S507, the scene control apparatus 110 generates a CG background image, by rendering a 3D model of virtual space using the viewpoint and angle of view of the camera 200. In the case of transitioning from step S505 to step S507, the scene control apparatus 110 generates a background image without changing the rendering parameters relating to brightness from the default values. The scene control apparatus 110 outputs data of the generated background image to the display control apparatus 120. Note that, in the case where the image capturing direction of the camera 200 is not directly facing the display apparatuses 310 and 320, the scene control apparatus 110 outputs the data of the background image to the display control apparatus 120 after applying processing for transforming the background image to an image viewed from a position directly facing the display apparatuses 310 and 320.

In step S509, the display control apparatus 120 causes the display apparatuses 310 and 320 to display the data of the background image generated by the scene control unit 110.

In step S511, the scene control unit 110 determines whether to end image capture in a similar manner to step S411. The scene control apparatus 110 ends the scene control operations if it is determined to end image capture, and executes the operations from step S501 again if it is not determined to end image capture.

If, in step S505, it is not determined for at least one of the region of the background image and the region of the specific subject that the brightness is appropriate, the scene control apparatus 110 determines in step S513 whether the luminance of the region of the background image results in overexposure or underexposure. The scene control apparatus 110 executes step S515 if it is determined that the luminance of the region of the background image results in overexposure or underexposure, and executes step S521 if it is not determined that the luminance of the region of the background image results in overexposure or underexposure.

The luminance that results in overexposure or underexposure changes, depending on the exposure settings of the camera 200. As described above, the exposure settings apart from the sensitivity for capturing are generally fixed during moving image shooting. Accordingly, a luminance range (luminance dynamic range) in which underexposure and overexposure do not occur can be stored in advance in association with each sensitivity for capturing. The scene control apparatus 110 is then able to determine whether the region of the background image is a luminance that results in overexposure or underexposure, based on the luminance dynamic range corresponding to the exposure settings of the camera 200 and the luminance of the region of the background image.

Step S521 is executed in the case where the luminance of the region of the background image is correct and the luminance of the region of the specific subject is not correct. In this case, the scene control apparatus 110 changes the brightness of the lighting equipment such that the brightness of the region of the specific subject is appropriate. Also, the scene control apparatus 110 does not change the brightness of the background image.

Accordingly, in step S521, the scene control apparatus 110 determines the amount of change in brightness of the lighting equipment 350. The amount of change in brightness may be the same as the amount of increase or decrease in brightness described in step S415 and step S421 of the scene control operations of the first mode. The scene control apparatus 110 determines the amount of increase in brightness when the luminance of the region of the specific subject is insufficient, and determines the amount of decrease in brightness when the luminance is too high.

In step S523, the scene control apparatus 110 changes the brightness of the lighting equipment 350, by outputting the amount of change in brightness to the lighting control apparatus 140. The scene control apparatus 110 may correct the amount of change in brightness and then output the corrected amount to the lighting control apparatus 140, similarly to the scene control operations of the first mode.

In the case of transitioning from step S523 to step S507, the brightness of the background image is not changed. Accordingly, the subsequent operations are executed similarly to the case of transitioning from step S505 to step S507. In step S515, the scene control apparatus 110 determines whether the luminance of the region of the specific subject is correct, and executes step S519 if it is determined that the luminance is correct, and executes step S517 if it is not determined that the luminance is correct.

Step S517 is executed in the case where the region of the background image is overexposed or underexposed and the brightness of the region of the specific subject is also not appropriate. In this case, the scene control apparatus 110 changes the brightness of the lighting equipment 350 such that the brightness of the region of the specific subject is appropriate. The brightness of the background image is also changed so as to be included in the range of the luminance dynamic range of the camera 200.

Specifically, the scene control apparatus 110 changes the brightness of the lighting equipment 350 with similar processing to step S521 and step S523. Also, the scene control apparatus 110 determines the amount of change in brightness of the background image. The amount of change in brightness of the background image may be the same as the amount of increase or decrease in brightness described in step S419 and step S423 of the scene control operations of the first mode. The scene control apparatus 110 determines the amount of increase in brightness when the luminance of the background image is insufficient, and determines the amount of decrease in brightness when the luminance is too high.

Step S519 is executed in the case where the region of the background image is overexposed or underexposed but the luminance of the region of the specific subject is appropriate. In this case, the scene control apparatus 110 changes the brightness of the background image such that the luminance range of the background image is included in the range of the luminance dynamic range of the camera 200, without changing the brightness of the lighting equipment 350. The scene control apparatus 110 determines the amount of change in brightness of the background image in a similar manner to step S517.

Note that, in the case where the camera 200 is set to the second AE restriction mode, the brightness of the lighting equipment 350 may be changed, without changing the brightness of the background image in step S519. The luminance of the region of the specific subject changes, due to the brightness of the lighting equipment 350 being changed. Since the camera 200 changes the sensitivity for capturing such that the region of the specific subject will be appropriately exposed, the luminance dynamic range of the camera 200 shifts. When the luminance range of the background image is included in the range of the luminance dynamic range of the camera 200, overexposure or underexposure of the background image is thereby resolved. Note that the amount of change in brightness of the lighting equipment needs to be determined such that the resulting change in the sensitivity for capturing of the camera 200 is within the range of change in sensitivity for capturing that is allowed in the second AE restriction mode. If the maximum amount of change in sensitivity for capturing that is allowed in the second AE restriction mode does not eliminate the overexposure or underexposure of the background image, the brightness of the background image is changed.

In the case of having transitioned from step S517 or step S519 to step S507, the scene control apparatus 110, in step S507, generates a background image in which the brightness has been changed, by applying the amount of change in brightness to the rendering parameters. The scene control apparatus 110 outputs data of the generated background image to the display control apparatus 120. The processing from step S509 onward is as described above.

Note that, similarly, in the scene control operations of the second mode, instead of applying the amount of change in brightness to the rendering parameters to change the brightness of the background image, the brightness of the background image may be changed by controlling the display apparatuses 310 and 320. Specifically, the scene control apparatus 110, in step S507, generates a background image without changing the rendering parameters relating to brightness from the default values. The scene control apparatus 110 then outputs the data of the background image and the amount of change in brightness to the display control apparatus 120.

In the case where the amount of change in brightness is provided by the scene control apparatus 110, the display control apparatus 120 applies the amount of change in brightness to a brightness serving as a reference of the display apparatuses 310 and 320 and causes the data of the background image to be displayed. The display apparatuses 310 and 320 thereby display the background image at a brightness reflecting the amount of change in brightness.

Here, cases where the configurations that exert an influence on the brightness of the captured scene are the display apparatuses 310 and 320 and the lighting equipment 350 are described as examples. However, these are merely illustrative examples and, if other configurations are included, these other configurations can also be targeted for control.

Modification 1

In the case of generating data of a background image in which the brightness has been changed, the scene control apparatus 110 is able to generate data of a background image in which the brightness has been changed, by applying, to data of a background image generated without changing the brightness, one of:
(1) changing luminance values uniformly (converting luminance values using linear conversion characteristics), and
(2) changing luminance values by an amount that depends on the luminance values (converting luminance values using nonlinear conversion characteristics).

In the case of (1), the amount of change in brightness need only be applied to the luminance values as a coefficient.

In the case of (2), the luminance of the background image is changed by applying a gamma curve having a gradient of less than 1 in high luminance portions when darkening the background image, and by applying a gamma curve having a gradient of greater than 1 in low luminance portions when brightening the background image. As a result of a function of a gamma curve having the amount of change in brightness as a variable being prepared in advance, it is possible to change the brightness of the background image using a gamma curve that corresponds to the amount of change in brightness that is determined.

Modification 2

In the case of changing the brightness of the background image by controlling the display apparatuses 310 and 320, the display control apparatus 120 can implement one of:
(1) changing luminance values uniformly for the entirety of the display apparatuses, and
(2) varying the amount of change in luminance values according to the brightness of the background image.

In the case of (1), the display luminance of the background image data is changed uniformly for the entirety of the display apparatuses 310 and 320. For example, in the case of the display apparatuses 310 and 320 having a backlight, the amount of change in brightness is uniformly applied to the luminance of the backlight. If the display apparatuses 310 and 320 are self-luminous display apparatuses, the amount of change in brightness is uniformly applied to the gain for adjusting the luminance.

In the case of (2), the amount of change that is applied is varied in units in which the luminance of the display apparatuses 310 and 320 is adjustable. For example, in the case where the display apparatuses 310 and 320 have an area division-type backlight, the luminance adjustment amount is varied by area, and, in the case where the display apparatuses 310 and 320 are constituted by a plurality of display panels, the amount of luminance adjustment is varied by panel.

Specifically, the average luminance of the background image data to be displayed is derived in units in which luminance is adjustable, and the amount of luminance adjustment is varied according to the average luminance. For example, the display control apparatus 120 divides the number of gradations of the luminance values of the image data into a plurality of ranges, and classifies the ranges to which the average luminances belong, using the boundaries of the ranges as threshold values. The display control apparatus 120 then allocates an amount of luminance adjustment for each classification.

In the case of darkening the background image, a large amount of change is allocated to portions belonging to a high luminance range, and a small amount of change is allocated to portions belonging to low luminance to medium luminance ranges. Luminance can thereby be controlled with characteristics that are similar to applying a gamma curve having a gradient of less than 1 in high luminance portions. Similarly, in the case of brightening the background image, a large amount of change is allocated to portions belonging to a low luminance range, and a small amount of change is allocated to portions belonging to medium to high luminance ranges. The luminance can thereby be controlled with characteristics that are similar to applying a gamma curve having a gradient of greater than 1 in low luminance portions.

Figure 4:
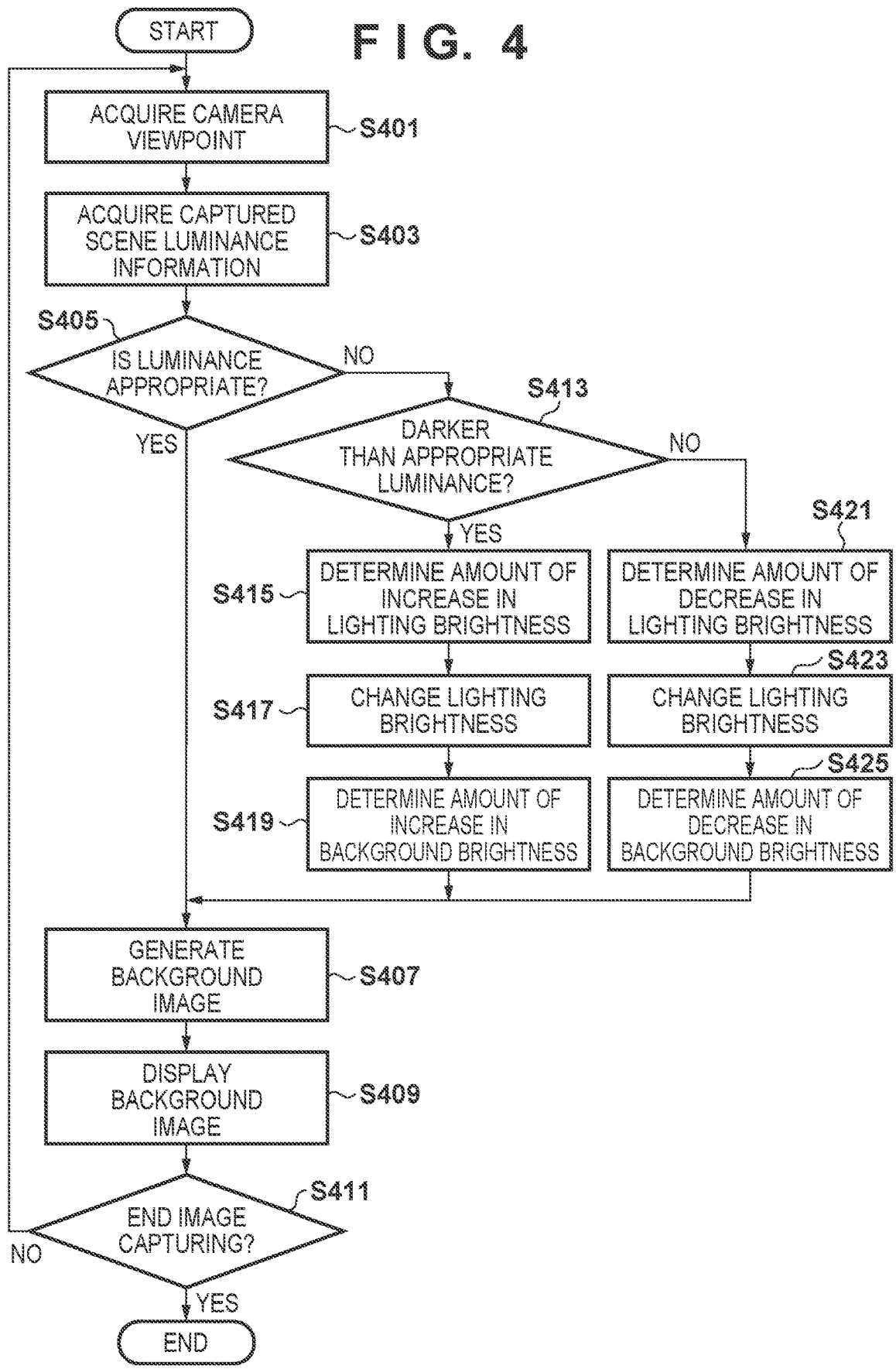
FIG. 4 is a flowchart relating to scene control operations of a first mode.

Note that the scene control operations shown in FIGS. 4 and 5 are executed within one frame period of the camera 200. Specifically, in the camera 200, the operations up to generation of the background image are completed in the period from when the exposure settings are derived at the image capture preparation stage of the next frame to when image capture of the next frame is started. The influence exerted by changes in brightness of the captured scene on the in-camera VFX video that is captured by the camera 200 can thereby be suppressed, and the occurrence of overexposure or underexposure of the background image, for example, can be avoided.

As described above, according to the present embodiment, the brightness of the captured scene of the camera that captures video with an image as the background is controlled so as to suppress changes in the exposure settings of the camera. Thus, even if the brightness of the captured scene changes during image capture, it is possible to suppress changes in the image quality of video and the background being overexposed or underexposed.

OTHER EMBODIMENTS

Note that, in the case where the entire scene or a region of a specific subject cannot be appropriately exposed even if the brightness of the background image and the brightness of the lighting equipment are changed to the maximum, the exposure of the camera 200 may be changeable such that the correct exposure is obtained. Specifically, the exposure of the camera 200 may be changeable even in the case where the first AE restriction mode is set. Also, in the case where the second AE restriction mode is set, the sensitivity for capturing may be changeable beyond the upper limit value or the lower limit value. Whether such a change in exposure is allowed may be settable by the user, for example. For example, in the scene control operations of the first mode, the scene control unit 110 derives a difference D=C−B [EV] between a luminance B [EV] of the captured scene acquired in step S403 and a correct luminance C [EV]. If D>0, then the scene control unit 110 determines whether an upper limit value $L_{upmax}$ [EV] of the amount of increase in brightness of the lighting, an upper limit value $B_{upmax}$ [EV] of the amount of increase in brightness of the background image and the difference D [EV] satisfy the relation:

$$D > L_{upmax} + B_{upmax} \quad (1)$$

If the relation of Equation 1 is satisfied, the scene control apparatus 110 instructs the control unit 240 of the camera 200 to perform image capture after increasing the exposure amount by d=D−($L_{upmax}$+$B_{upmax}$) [EV].

Similarly, if D<0, the scene control unit 110 determines whether an upper limit value $L_{downmax}$ [EV] of the amount of decrease in brightness of the lighting, an upper limit value $B_{downmax}$ [EV] of the amount of decrease in brightness of the background image and the difference D [EV] satisfy the relation:

$$|D| > L_{downmax} + B_{downmax} \quad (2)$$

If the relation of Equation 2 is satisfied, the scene control apparatus 110 instructs the control unit 240 of the camera 200 to perform image capture after reducing the exposure amount by d=|D|−($L_{downmax}$+$B_{downmax}$) [EV].

In the case of the scene control operations of the second mode, the scene control apparatus 110 is able to allow the exposure settings of the camera 200 to be changed, in the case where the region of the specific subject cannot be appropriately exposed with the amount of change in brightness of the lighting determined in step S517 or step S521. For example, the scene control apparatus 110 derives the difference D=C−B [EV] between the correct luminance C [EV] and the current luminance B [EV] for the region of the specific subject. If D>0, then the scene control unit 110 determines whether the upper limit $L_{upmax}$ [EV] of the amount of increase in brightness of the lighting and the difference D [EV] satisfy the relation:

$$D > L_{upmax} \quad (3)$$

If the relation of Equation 3 is satisfied, the scene control apparatus 110 instructs the control unit 240 of the camera 200 to perform image capture after increasing the exposure amount by d=D−$L_{upmax}$ [EV]. Also, if the background image is overexposed due to the increase in the exposure amount, the scene control apparatus 110 determines an amount of decrease in brightness of the background image that depends on d.

Similarly, if D<0, the scene control unit 110 determines whether the upper limit value $L_{downmax}$ [EV] of the amount of decrease in brightness of the lighting and the difference D [EV] satisfy the relation:

$$|D| > L_{downmax} \quad (4)$$

If the relation of Equation 4 is satisfied, the scene control apparatus 110 instructs the control unit 240 of the camera 200 to perform image capture after reducing the exposure amount by d=|D|−$L_{downmax}$ [EV]. Also, in the case where the background image is underexposed due to the reduction in exposure amount, the scene control apparatus 110 determines an amount of increase in brightness of the background image that depends on d.

Also, in the above-described embodiment, the case where the background image is a CG image is described. However, captured images may also be used for the background image. In this case, the viewpoint of the camera that captures the background image is synchronized with the viewpoint of the camera 200. Also, video of the background image that is captured is supplied from the camera to the display control apparatus 120. The brightness of the background image that is captured can be changed, by outputting the amount of change in brightness to the camera that captures the background image, and the camera changing the sensitivity for capturing according to the amount of change in brightness.

Also, in the above-described embodiment, a configuration is described in which the scene control apparatus 110, the display control apparatus 120 and the lighting control apparatus 140 are separate apparatuses. However, the scene control apparatus 100 may have the functions of the display control apparatus 120 and the lighting control apparatus 140.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-032178, filed Mar. 2, 2023, which is hereby incorporated by reference herein in its entirety.

What is claimed is:

1. A scene control apparatus comprising:
one or more processors that execute a program stored in a memory and thereby function as:
an acquisition unit configured to acquire information relating to luminance of a captured scene of an image capture apparatus;
a determination unit configured to determine, based on the information, whether a brightness of at least one of lighting equipment configured to light up the captured scene and video that is displayed as a background of the captured scene needs to be changed; and a control unit configured to change, according to a result of the determination, the brightness of at least one of the lighting equipment that lights up the captured scene and the video that is displayed as the background of the captured scene, wherein the control unit changes the brightness of the video so as to fall within a range of a luminance dynamic range of the image capture apparatus that is based on the information.

2. The scene control apparatus according to claim 1, wherein the determination unit determines that the brightness of at least one of the lighting equipment and the video needs to be changed, if it is determined, based on the information, that a sensitivity for capturing needs to be changed in the image capture apparatus.

3. The scene control apparatus according to claim 2, wherein the determination unit determines that the brightness of at least one of the lighting equipment and the video needs to be changed, if the sensitivity for capturing based on the information deviates from the luminance dynamic range of the image capture apparatus.

4. The scene control apparatus according to claim 1, wherein the control unit changes the brightness of the video by controlling a display apparatus configured to display the video.

5. The scene control apparatus according to claim 1, wherein the control unit changes the brightness of the video by changing data representing the video.

6. The scene control apparatus according to claim 1, wherein the control unit changes the brightness of the lighting equipment and the brightness of the video so as to compensate for an insufficient or excessive exposure amount in the image capture apparatus.

7. The scene control apparatus according to claim 1, wherein the control unit performs control such that, in a case where the image capture apparatus is performing exposure control such that a specific subject within the captured scene is appropriately exposed, the brightness of the video falls within the range of the luminance dynamic range of the image capture apparatus by changing the brightness of the lighting equipment lighting up the specific subject.

8. The scene control apparatus according to claim 1, wherein the control unit, in a case of changing the brightness of the video, changes the brightness of an entirety of the background represented by the video.

9. The scene control apparatus according to claim 1, wherein the control unit changes the brightness of the video by converting a luminance of data of the video in a nonlinear manner.

10. The scene control apparatus according to claim 1, wherein processing from acquisition of the information by the acquisition unit to changing of the brightness by the control unit is executed within one frame period of the image capture apparatus.

11. The scene control apparatus according to claim 1, wherein the control unit instructs the image capture apparatus to change an exposure setting, in a case where the captured scene or a region of the specific subject in the captured scene will not be correctly exposed even if the brightness of the lighting equipment and the brightness of the video are changed.

12. A virtual studio system comprising:
an image capture apparatus;
a scene control apparatus;
a display apparatus configured to display a background of a captured scene of the image capture apparatus; and
lighting equipment configured to light up a subject present in the captured scene,
wherein the scene control apparatus comprising:
one or more processors that execute a program stored in a memory and thereby function as:
an acquisition unit configured to acquire information relating to luminance of a captured scene of an image capture apparatus;
a determination unit configured to determine, based on the information, whether a brightness of at least one of lighting equipment configured to light up the captured scene and video that is displayed as a background of the captured scene needs to be changed; and
a control unit configured to change, according to a result of the determination, the brightness of at least one of the lighting equipment that lights up the captured scene and the video that is displayed as the background of the captured scene,
wherein the control unit changes the brightness of the video so as to fall within a range of a luminance dynamic range of the image capture apparatus that is based on the information, and
wherein the image capture apparatus comprising:
one or more processors that execute a program stored in a memory and thereby function as:
a generation unit configured to generate information relating to a luminance of a captured scene;
an output unit configured to output the information to an external apparatus;
a determination unit configured to determine exposure settings that are based on the information; and
an image capture unit configured to capture based the exposure settings,
wherein the determination unit, in a case where the exposure settings that are based on the information change to exceed a predetermined range from current exposure settings, determines exposure settings that does not exceed the predetermined range from the current exposure settings.

13. A scene control method for execution by a scene control apparatus, the method comprising:
acquiring information relating to luminance of a captured scene of an image capture apparatus;
determining, based on the information, whether a brightness of at least one of lighting equipment configured to light up the captured scene and video that is displayed as a background of the captured scene needs to be changed; and
changing, according to a result of the determination, the brightness of at least one of the lighting equipment that lights up the captured scene and the video that is displayed as the background of the captured scene,
wherein the changing changes the brightness of the video so as to fall within a range of a luminance dynamic range of the image capture apparatus that is based on the information.

14. A non-transitory computer-readable medium storing a program that causes, when executed by a computer, the computer to function as a scene control apparatus comprising:
an acquisition unit configured to acquire information relating to luminance of a captured scene of an image capture apparatus;

a determination unit configured to determine, based on the information, whether a brightness of at least one of lighting equipment configured to light up the captured scene and video that is displayed as a background of the captured scene needs to be changed; and a control unit configured to change, according to a result of the determination, the brightness of at least one of the lighting equipment that lights up the captured scene and the video that is displayed as the background of the captured scene, wherein the control unit changes the brightness of the video so as to fall within a range of a luminance dynamic range of the image capture apparatus that is based on the information.

15. A scene control apparatus comprising:

one or more processors that execute a program stored in a memory and thereby function as:

an acquisition unit configured to acquire information relating to luminance of a captured scene of an image capture apparatus;

a determination unit configured to determine, based on the information, whether a brightness of at least one of lighting equipment configured to light up the captured scene and video that is displayed as a background of the captured scene needs to be changed; and a control unit configured to change, according to a result of the determination, the brightness of at least one of the lighting equipment that lights up the captured scene and the video that is displayed as the background of the captured scene, wherein the control unit changes the brightness of the video by converting a luminance of data of the video in a nonlinear manner.

16. A scene control method for execution by a scene control apparatus, the method comprising:

acquiring information relating to luminance of a captured scene of an image capture apparatus;

determining, based on the information, whether a brightness of at least one of lighting equipment configured to light up the captured scene and video that is displayed as a background of the captured scene needs to be changed; and changing, according to a result of the determination, the brightness of at least one of the lighting equipment that lights up the captured scene and the video that is displayed as the background of the captured scene, wherein the changing changes the brightness of the video by converting a luminance of data of the video in a nonlinear manner.

* * * * *